United States Patent [19]
Hannah

[11] Patent Number: 5,886,744
[45] Date of Patent: *Mar. 23, 1999

[54] METHOD AND APPARATUS FOR FILTERING JITTER FROM MOTION ESTIMATION VIDEO DATA

[75] Inventor: Eric C. Hannah, Pebble Beach, Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 525,287

[22] Filed: Sep. 8, 1995

[51] Int. Cl.$^6$ ....................................................... H04N 7/32
[52] U.S. Cl. ........................... 348/416; 348/208; 348/699
[58] Field of Search ..................................... 348/699, 416, 348/413, 402, 401, 400, 415, 409, 390, 384, 208; 382/236, 238, 232; H04N 7/137

[56] References Cited

U.S. PATENT DOCUMENTS

| | | | |
|---|---|---|---|
| 4,837,632 | 6/1989 | Kubo et al. | 348/208 |
| 4,849,810 | 7/1989 | Ericsson | 348/416 |
| 4,998,162 | 3/1991 | Kondo | 348/224 |
| 5,016,107 | 5/1991 | Sasson et al. | 348/231 |
| 5,019,901 | 5/1991 | Uomori et al. | 348/699 |
| 5,065,246 | 11/1991 | Takemoto et al. | 348/354 |
| 5,107,293 | 4/1992 | Sekine et al. | 348/208 |
| 5,126,841 | 6/1992 | Tanaka et al. | 348/415 |
| 5,142,380 | 8/1992 | Sakagami et al. | 358/432 |
| 5,150,209 | 9/1992 | Baker et al. | 348/407 |
| 5,151,784 | 9/1992 | Lavagetto et al. | 348/416 |
| 5,173,773 | 12/1992 | Ueda et al. | 348/407 |
| 5,198,896 | 3/1993 | Kondo et al. | 348/208 |
| 5,198,901 | 3/1993 | Lynch | 348/413 |
| 5,251,028 | 10/1993 | Iu | 348/400 |
| 5,309,243 | 5/1994 | Tsai | 348/221 |
| 5,329,318 | 7/1994 | Keith | 348/699 |
| 5,357,281 | 10/1994 | Ikeda et al. | 348/401 |
| 5,384,595 | 1/1995 | Sakaguchi | 348/208 |
| 5,386,264 | 1/1995 | Sekine et al. | 348/208 |
| 5,412,430 | 5/1995 | Nagata | 348/402 |
| 5,414,464 | 5/1995 | Sasaki | 348/222 |
| 5,416,520 | 5/1995 | Kuzma | 348/409 |
| 5,436,666 | 7/1995 | Astle | 348/416 |
| 5,452,021 | 9/1995 | Kusaka et al. | 348/208 |
| 5,497,191 | 3/1996 | Yoo et al. | 348/208 |

FOREIGN PATENT DOCUMENTS 0514167  11/1992  European Pat. Off. .

Primary Examiner—Bryan Tung
Attorney, Agent, or Firm—William H. Murray; N. Stephan Kinsella

[57] ABSTRACT

A method, means, and computer program are provided for filtering jitter from motion estimation video data. The movement of one or more identifying features of an image is observed over a plurality of frames. The movement is analyzed and a pattern to the movement is determined. The pattern is analyzed for a jitter signature. In the event the pattern reflects the presence of jitter, the data associated with the affected frames of video is filtered by, for example, altering the magnitude of motion vectors to offset the components of jitter or discarding affected motion vectors. Embodiments of the invention filter translational jitter in either or both of the x- and y-axes as well as rotational jitter from motion estimation data. In one embodiment of the invention, motion vectors themselves are analyzed for the presence of jitter. In the event jitter is identified, affected motion vectors are discarded or filtered.

30 Claims, 10 Drawing Sheets

FRAME 1

| IDENTFIED EDGE MOVEMENT | COMMON EDGE MOVEMENT = JITTER |
|---|---|
| $E_1 = +1$ PIXEL | $E_{134} = +1$ PIXEL |
| $E_2 = +5$ | FILTERING |
| $E_3 = +1$ | $MV_2 \text{ FILTERING} = E_2 - E_{134} = +5 - (+1) = +4$ |
| $E_4 = +1$ | $MV_5 \text{ FILTERING} = E_5 - E_{134} = -5 - (+1) = -6$ |
| $E_5 = -5$ | $MV_{134} \text{ FILTERING} = E_{134} - E_{134} = +1 - (+1) = \emptyset$ |

FRAME 2

| IDENTFIED EDGE MOVEMENT | COMMON EDGE MOVEMENT = JITTER |
|---|---|
| $E_1 = -1$ PIXEL | $E_{134} = -1$ PIXEL |
| $E_2 = +3$ | FILTERING |
| $E_3 = -1$ | $MV_2 \text{ FILTERING} = E_2 - E_{134} = +3 - (-1) = +4$ |
| $E_4 = -1$ | $MV_5 \text{ FILTERING} = E_5 - E_{134} = -6 - (-1) = -5$ |
| $E_5 = -6$ | $MV_{134} \text{ FILTERING} = E_{134} - E_{134} = -1 - (-1) = \emptyset$ |

FRAME 3

| IDENTFIED EDGE MOVEMENT | COMMON EDGE MOVEMENT = JITTER |
|---|---|
| $E_1 = \emptyset$ PIXELS | $E_{134} = \emptyset$ PIXELS |
| $E_2 = +4$ | FILTERING |
| $E_3 = \emptyset$ | $MV_2 \text{ FILTERING} = E_2 - E_{134} = +4 - \emptyset = +4$ |
| $E_4 = \emptyset$ | $MV_5 \text{ FILTERING} = E_5 - E_{134} = -4 - \emptyset = -4$ |
| $E_5 = -4$ | $MV_{134} \text{ FILTERING} = E_{134} - E_{134} = \emptyset - \emptyset = \emptyset$ |

FRAME 4

| IDENTFIED EDGE MOVEMENT | COMMON EDGE MOVEMENT = JITTER |
|---|---|
| $E_1 = +2$ PIXELS | $E_{134} = +2$ PIXELS |
| $E_2 = +6$ | FILTERING |
| $E_3 = +2$ | $MV_2 \text{ FILTERING} = E_2 - E_{134} = +6 - (+2) = +4$ |
| $E_4 = +2$ | $MV_5 \text{ FILTERING} = E_5 - E_{134} = -1 - (+2) = -3$ |
| $E_5 = -1$ | $MV_{134} \text{ FILTERING} = E_{134} - E_{134} = +2 - (+2) = \emptyset$ |

FIG. 5b

METHOD AND APPARATUS FOR FILTERING JITTER FROM MOTION ESTIMATION VIDEO DATA

BACKGROUND OF THE INVENTION

1. Field of the Invention

This invention relates to the field of video processing and more particularly to motion estimation used in video compression.

2. Description of the Related Art

Motion estimation is commonly used by video encoders that compress successive frames of digital video data ("video frames"). When video frames are to be transmitted via a communication medium of limited bandwidth, or are to be stored in a storage medium having limited storage capacity, it often is desirable to compress the digital data which represents each frame, so as to reduce the amount of data that needs to be transmitted or stored.

Motion estimation and motion compensation exploit the temporal correlation that often exists between consecutive video frames. For block-based motion estimation, each input frame is divided into blocks and motion estimation is performed on each block relative to blocks in a reference frame (block matching) to generate a motion vector for each block. These motion vectors are then used to assemble a motion compensated frame. Any difference between the motion compensated frame and the input frame is represented by difference data. Since motion vectors and difference data are typically represented with fewer bits than the pixels that comprise the original image, fewer bits need to be transmitted (or stored) in order to represent the input frame. In some conventional video encoders, the motion vectors (and difference data) are further encoded to generate an encoded bitstream for the video sequence. It is preferred that block matching be accurate, as this will tend to minimize the magnitude of the motion vectors and, especially, the amount of difference data.

A reference frame can be the previous motion compensated frame or a "key" frame, which is an actual frame of video not compressed by motion estimation processing. Many conventional video encoders are designed to transmit a key frame at predetermined intervals, e.g. every 10th frame, or at a scene change.

Often, motion vectors are very similar from block to block. In an ideal video encoding system, during slow camera panning of a static scene, all of the motion vectors (except perhaps those for blocks at the edge of an image) point in the direction of the camera's motion and are of equal magnitude. This allows a video coder to use standard techniques such as run length encoding to further encode the motion vectors.

Real video encoding systems, on the other hand, generate noise which may be insignificant and unnoticeable to human vision, but which may be detected and treated as real motion by the video coder during motion estimation processing.

An example of such noise is jitter. Jitter typically is random, oscillatory movement of an entire frame in either or both of the x and y planes or about the z axis (rotation). Jitter can cause a static object in an image to appear as if it has moved, when in fact it has not, and can distort actual image movement. Jitter can have significant adverse effects on motion estimation coding. Jitter has a number of causes, the most obvious of which is the physical movement or vibration of a video camera. Jitter also can arise from mechanical faults or imperfections, such as time-base errors induced by the unsmooth motion of the head drum of a video recorder, and from electrical faults or imperfections, such as supply voltage fluctuations and control system instability in video capture systems.

Motion estimation interprets jitter as legitimate image motion and processes it, resulting in substantially increased data rates from a resulting increase in the magnitude or number of different motion vectors and a decrease in the run lengths of run length encoded motion vectors.

A process and apparatus therefore are needed for characterizing the occurrence of jitter in frames of video, particularly when the video is to be encoded using motion estimation, and for filtering the jitter from the encoded video to prevent it from adversely affecting motion estimation processing.

SUMMARY OF THE INVENTION

It is an object of the invention to provide an apparatus, computer-implemented method and computer program for motion estimation processing of video wherein the adverse affects of jitter on motion estimation processing are inhibited. One or more common features in a succession of frames are identified and the movement of the common features through the succession of frames is observed and analyzed. A pattern to the movement is determined. Motion vectors, or components thereof, which are attributable to jitter, as opposed to real motion of the image or camera, are discarded or filtered in accordance with the pattern.

BRIEF DESCRIPTION OF THE DRAWINGS

The following detailed description will be more fully understood with reference to the accompanying drawings in which:

FIG. 5b is a data table demonstrating the operation of the edge detector/analyzer and jitter filter of FIG. 5a.

DETAILED DESCRIPTION OF THE PREFERRED EMBODIMENTS

Figure 1:
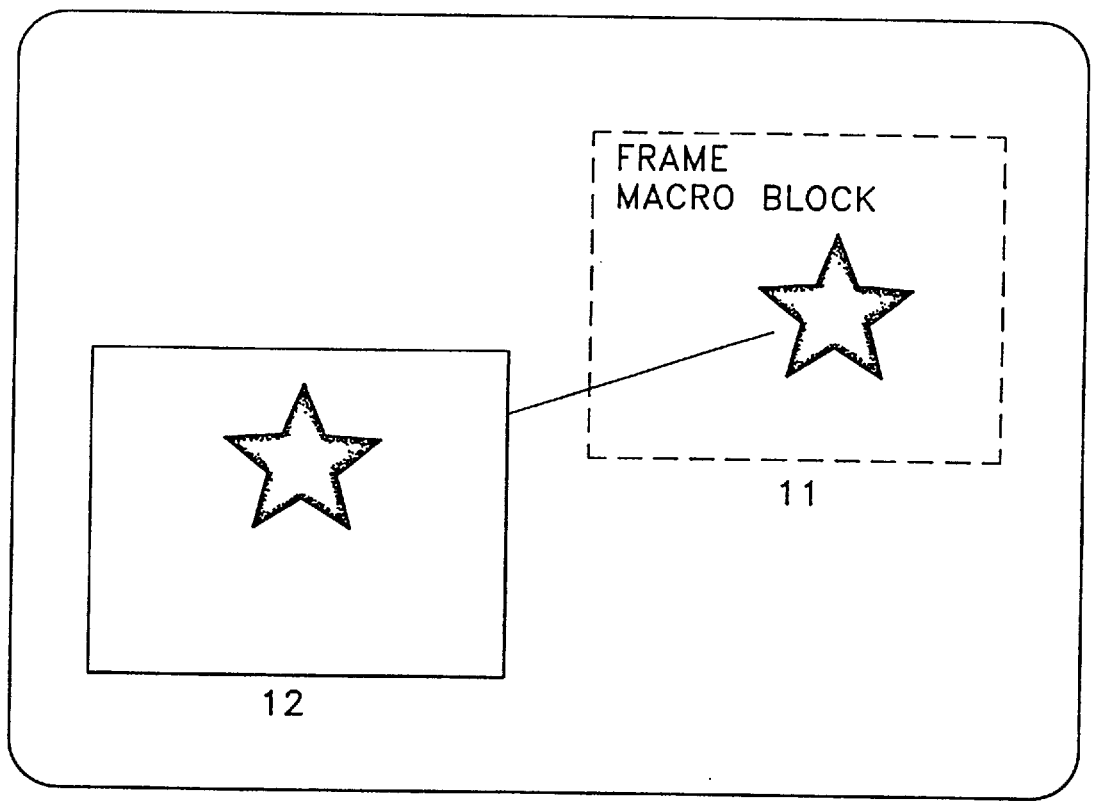
FIG. 1 is an illustration of block matching between frames.

As noted, motion estimation and motion compensation exploit the temporal correlation that often exists between consecutive video frames. As shown in FIG. 1, block 11 represents a block in a reference frame and block 12 a block in an input frame. The block in the input frame is shown in FIG. 1 to be displaced in two dimensions with respect to the same block in the reference frame as a result of object and/or camera movement. However, most of the information in the block, i.e. the pixel values, is relatively unchanged.

Figure 2:
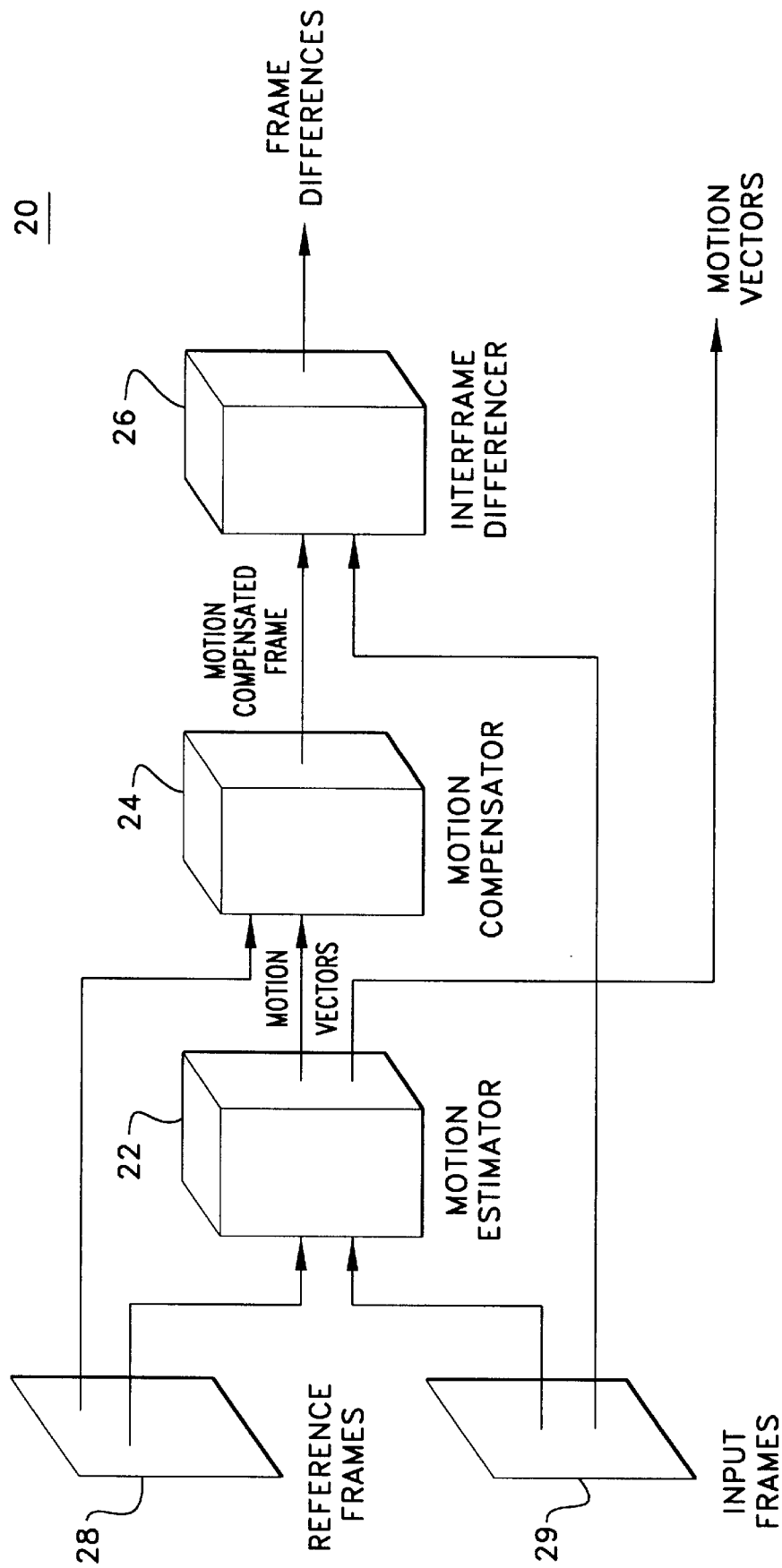
FIG. 2 is a block diagram of a prior art motion estimation video codec architecture.

Referring now FIG. 2, there is shown typical motion estimation video codec architecture 20. Motion estimator 22 compares blocks in an input frame 29 to regions or blocks within reference frame 28, searching for a best match between blocks. This is known as block matching. Motion estimator 22 generates motion vectors corresponding to the displacement of blocks in input frame 29 from respective best-matching blocks in reference frame 28.

Motion compensator 24 applies the motion vectors generated by motion estimator 22 to corresponding blocks in reference frame 28 to generate a motion compensated frame. Motion compensator 24 essentially moves reference frame blocks into the positions which correspond to the positions in which the best matching blocks have been located in input frame 29. Interframe differencer 26 generates frame differences by subtracting the motion compensated frame from the input frame. The motion vectors and the frame differences for the various blocks may then be further encoded for transmission and/or storage.

In many cases, motion vectors for adjacent blocks in a given frame will be similar or equal in magnitude and direction. For example, during slow, uniform panning of a camera across a static scene, the blocks move from frame to frame essentially at the same rate as the camera, in a direction opposite to the direction of panning. Since the motion vectors are similar or even identical, they may be encoded using a run-length encoding process.

Jitter, which is well known in the art, is random, typically oscillatory and high-frequency motion of small magnitude of an entire frame's contents. Jitter can occur in the x and y planes and also appear as rotation. Jitter has a number of causes, the most obvious of which are mechanical vibrations, such as those likely to occur from the shaking of a hand-held video camera. Jitter also can arise from mechanical faults or imperfections in a video recorder or input device, such as time-base errors induced by the unsmooth motion of the head drum of a video recorder. Jitter also can result from, for example, supply voltage fluctuations and control system instability and other electronic noise.

Jitter adversely affects motion estimation by generating "false" motion vectors which otherwise must be compressed and transmitted and by substantially reducing run lengths, thereby detrimentally increasing the quantity of data being processed or stored.

Figure 3:
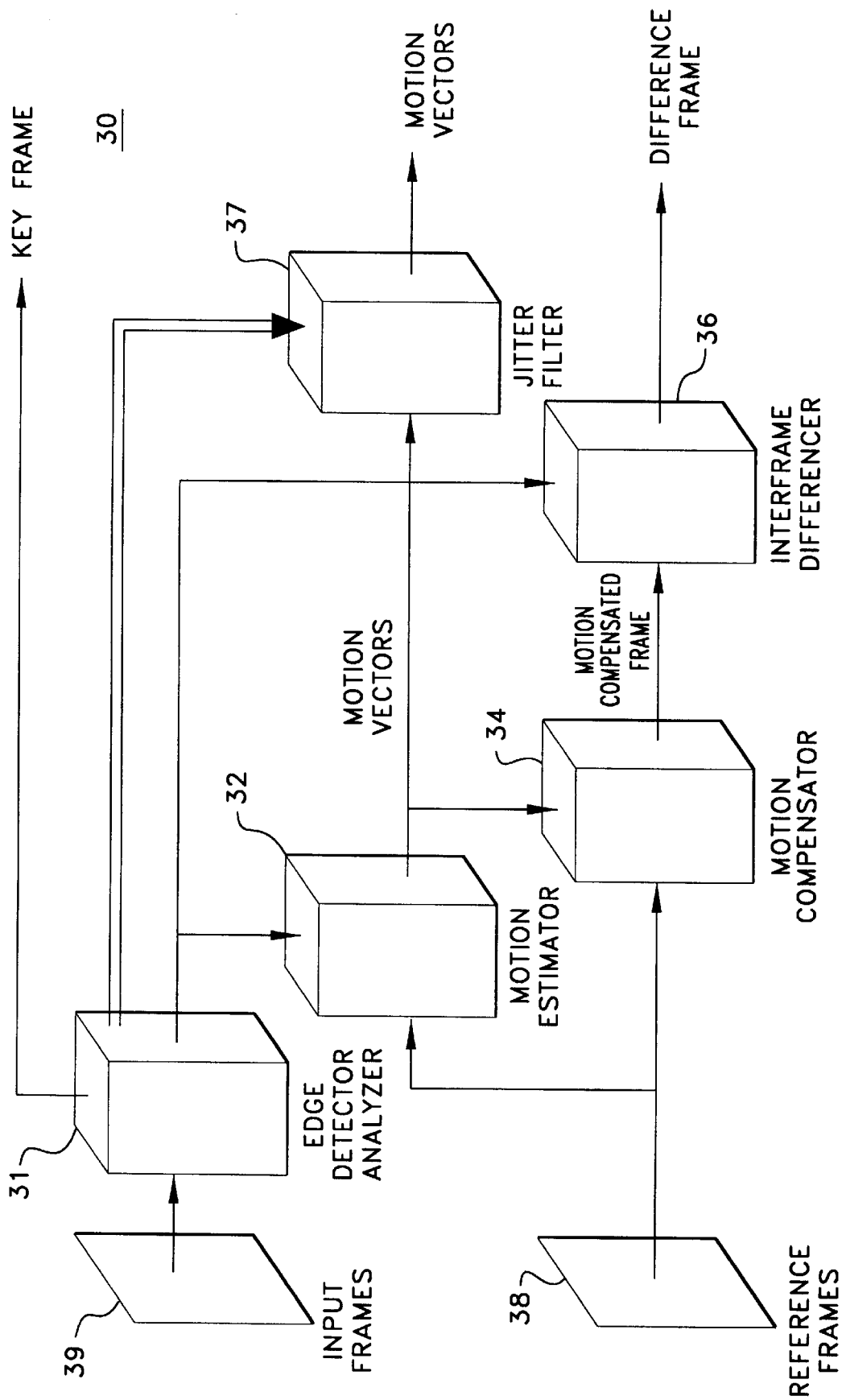
FIG. 3 is a block diagram of a preferred embodiment of the jitter filtering motion estimation video codec architecture of the present invention.

Referring now to FIG. 3, there is shown a block diagram of the video codec architecture of the present invention. Video codec architecture 30 includes edge detector/analyzer 31, motion estimator 32, motion compensator 34, interframe differencer 36 and jitter filter 37. Input frames 39 pass through edge detector/analyzer 31, which identifies, for example, strong horizontal and/or vertical edges in the image of the input frames. As is well known in the art, the sequence of video frames input at 39 can include one or more key frames, i.e. frames which are not subject to video compression and which often are used as a reference for the start of a particular video scene. Preferably, filtering starts with a key frame, i.e. strong edges of the image in the key frame are identified by edge detector/analyzer 31 and become the reference for identifying any movement of edges in the next or subsequent input frames. Edge detector/ analyzer 31 identifies strong edges in a series of input frames and compares the relative positions of the edges for successive frames. Edge detector/analyzer 31 analyzes any edge motion detected and determines whether the motion is legitimate "real" motion, or jitter, in which case edge detector/analyzer 31 instructs jitter filter 37 to discard, or preferably filter, the motion vectors associated with frames corrupted by jitter.

Figure 4A:
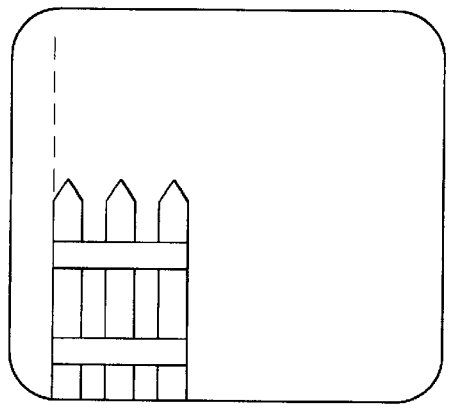
FIGS. 4a–4f are representations of sequential video frames depicting jitter along the x-axis.
Figure 4B:
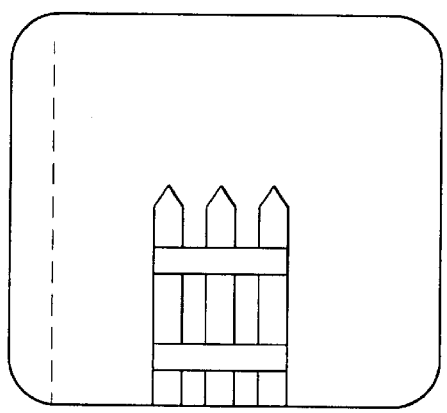
Figure 4C:
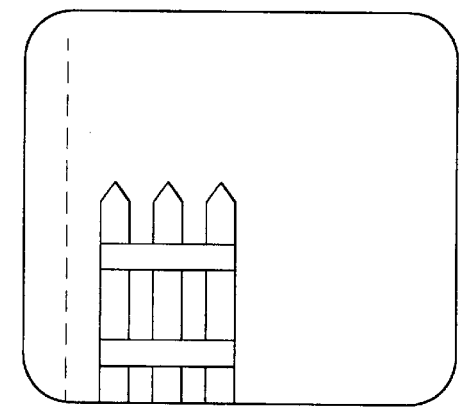
Figure 4D:
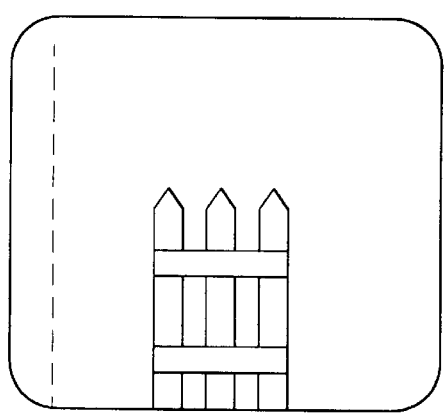
Figure 4E:
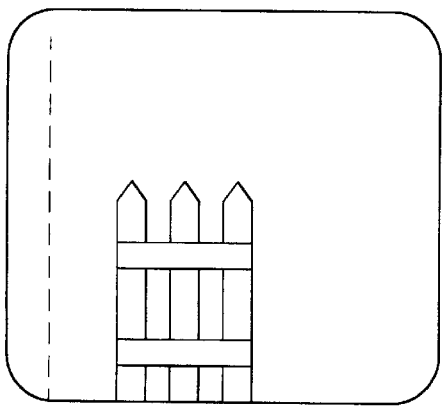
Figure 4F:
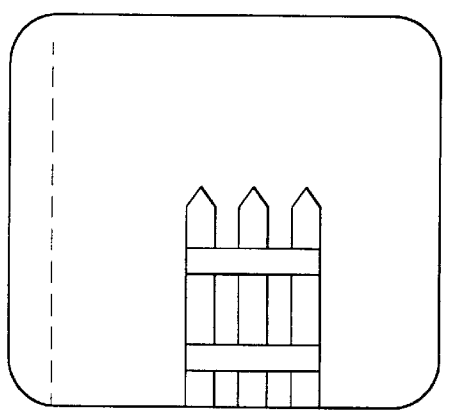

FIGS. 4a–4f depict a sequence of video frames wherein jitter is causing translation of an image along the x-axis. FIG. 4a depicts an image of a picket fence. The picket fence image presents very strong vertically oriented edges which easily are identified using known edge masking techniques. FIG. 4a can represent, for example, a key frame. FIG. 4b shows displacement of the image, in particular the identified edges of vertical slats of the picket fence by three pixels to the right along the x-axis. FIG. 4c shows movement of the image, and in particular the identified edges, to the left by two pixels distance with reference to FIG. 4b. In FIG. 4d, the edges are displaced to the right by two pixels relative to the previous frame shown in FIG. 4c. FIG. 4e shows movement to the left by one pixel with reference to the previous frame of FIG. 4d. FIG. 4f shows movement to the right by two pixels with reference to the previous frame of FIG. 4e.

The random, oscillatory movement depicted in FIGS. 4a–4f likely is jitter and preferably motion vectors corrupted by jitter are filtered prior to being encoded and transmitted or stored by video codec architecture 30. Filtering can entail complete nullification of a motion vector where the motion vector is entirely comprised of jitter.

Figure 5A:
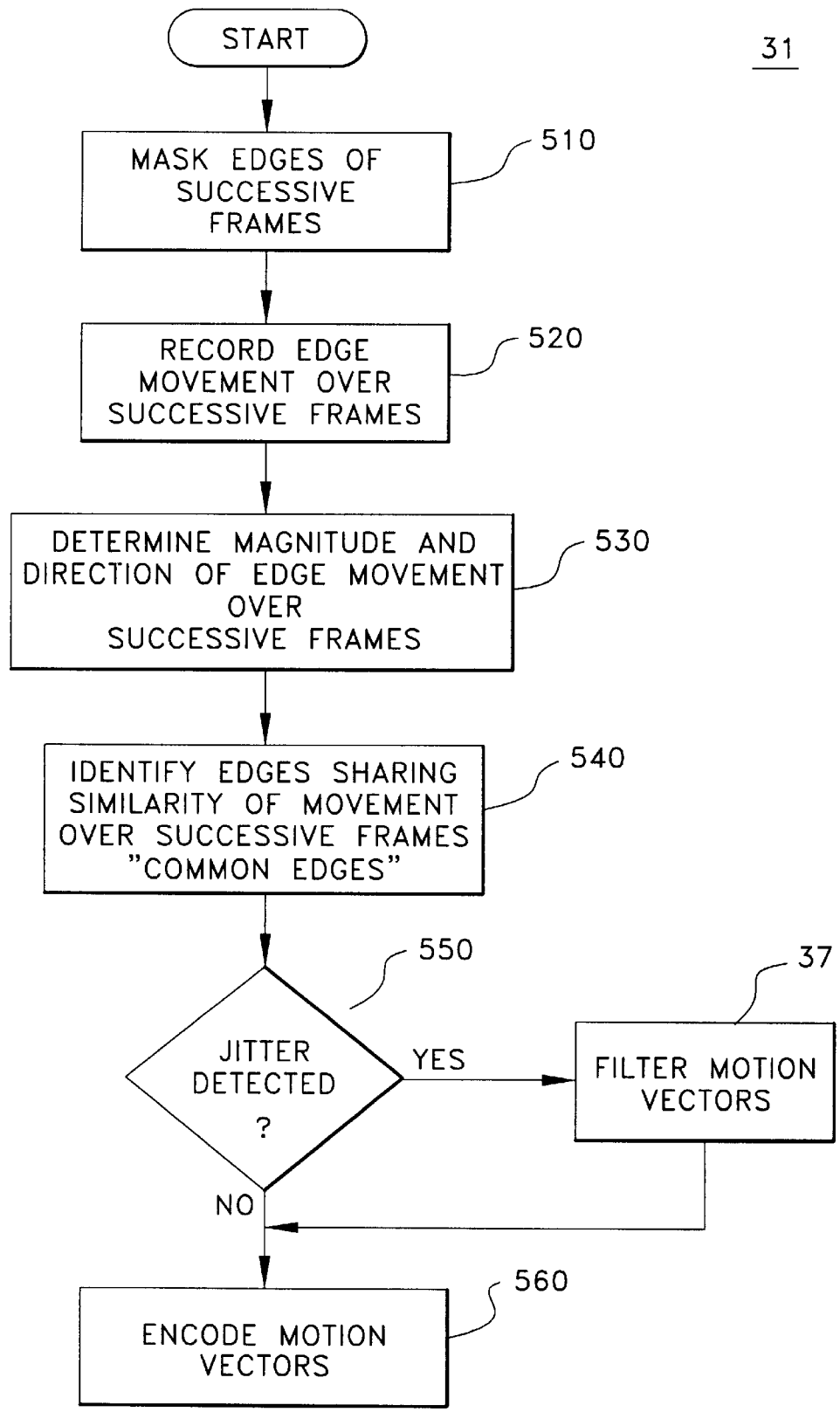
FIG. 5a is a flow chart diagram of an edge detector/analyzer and jitter filter of the architecture of FIG. 3.

Referring to FIG. 5a, which more particularly shows the edge detector/analyzer 31, and jitter filter 37 of video codec architecture 30, means 510 masks the vertically oriented edges of, for example, the picket fence of FIG. 4. Means 510 preferably also is operable to perform image recognition on the picket fence in FIG. 4 to further assist in identifying movement of the edges of the picket fence from frame-to-frame. Means 520 records the movement with respect to a preceding frame of the identified edges. Means 530 determines the magnitude and direction of the movements of the identified edges through the succession of frames. Means 540 identifies a plurality of edges in each frame which relatively consistently share a similarity of magnitude and direction (directional magnitude) of movement from frame-to-frame ("common edges"). With respect to the picket fence of FIG. 4, for example, means 540 would identify that each vertical edge is displaced by a similar amount as compared to the other vertical edges, from frame-to-frame. In FIG. 4b, for example, means 530 determines that the edges are displaced +3 pixels, where the directional magnitude of a movement to the right along the x-axis is arbitrarily assigned a positive value, since all of the vertically oriented edges identified in FIG. 4b have been caused by jitter to move three pixels to the right. Means 540 would identify that all vertical edges in FIG. 4b share a similarity of directional magnitude of edge movements, namely +3 pixels. Means 540 further identifies that all vertical edges share a similarity of movement of −2, +2, −1 and +2 pixels with respect to the frames shown in FIGS. 4c–4f. Means 550 analyzes the directional magnitude of the edge displacements of the "common edges" identified by means 540. In this case, the edge displacement from frame-to-frame (+3, −2, +2, −1, +2 pixels) appears random and oscillatory and also is small magnitude and zero-crossing, and therefore likely is associated with jitter. In such cases where means 550 identifies entirely random and/or oscillatory edge movement, jitter filter 37, under the control of means 550, preferably filters the motion vectors generated by motion estimator 32 which are associated with these frames, since each likely includes false data which otherwise would be wastefully processed, i.e. encoded and transmitted, and which if transmitted could degrade the decoded image. Where the entire directional magnitude of a motion vector is comprised of jitter, the motion vector is filtered such that it is effectively discarded. Other embodiments of the filter, as discussed below, remove from the motion vectors any potion of the motion vector which is attributable to jitter.

In many cases there will be one or more objects moving in the scene generating legitimate motion vectors which can be corrupted by jitter. The invention preferably identifies and filters from such motion vectors any component thereof attributable to jitter.

As stated above, means 530 determines magnitudes and directions of edge movement over successive frames and means 540 identifies "common edges" sharing a similarity of movement from frame-to-frame. Means 550 queries whether the "common edge" movement identified by means 530 is due to jitter.

There likely will be a plurality of such common edges since a scene likely includes a number of stationary images having edges, such as in the background which, but for jitter, would be stationary but instead exhibit a similarity of movement from frame-to-frame. However, it is possible that only a single edge will be identified which would have been stationary, but for jitter, which can be relied on for determining the directional magnitude of jitter from frame-to-frame. For example, if a single edge is shown to move +2, 0, −1, −1, +1 and 0 pixels from frame-to-frame, and no other edges exhibit such random, oscillatory zero-crossing characteristics, it is probable that only one otherwise stationary edge is present in the image. The jitter filter of the invention is operable to filter motion vectors in accordance with information on jitter gleaned from a single edge. In such a case, the step of identifying common edges performed by means 540 effectively is skipped.

As explained above, jitter will cause a number of common edges to exhibit small magnitude, high frequency, usually zero-crossing oscillations in their movement with respect to their position in the previous frame. For example, a plurality of otherwise stationary edges affected by jitter could move +2, 0, −1, −1, +1 and 0 pixel over a 6 frame sequence. Means 540 will identify these edges, which likely are large in number per frame.

A scene might include, for example, a car moving at +5 pixel per frame. Note that because of the jitter identified above, edges associated with the car will appear to be moving at +7, +5, +4, +4, +6 and +5 pixel/frame over the 6 frame sequence. The movement of edges associated with the car is not small-magnitude, random or zero-crossing, and would not be interpreted by means 550 as jitter. Furthermore, there likely will be significantly fewer edges associated with the real movement of the car as compared to the common edges moving solely because of jitter. If jitter is not detected, e.g. if the "common edges" don't exhibit random, oscillatory, small-magnitude, and/or zero-crossing motion through a series of frames, means 560 will encode the motion vectors or transmit them for encoding. If jitter is present, the motion vectors are filtered by jitter filter 37.

Jitter filter 37 subtracts the component of average movement of the common edges in each frame in an axis, which likely is the jitter for that frame in that axis, from all of the motion vectors associated with that frame which have a component of directional magnitude in the subject axis. Two-dimensional jitter is filtered from motion vectors by separately filtering the jitter present in each axis from each of the respective components of the directional magnitude of the motion vectors in each axis. When jitter is subtracted from the motion vectors associated with the "common edges", the otherwise stationary edges, the motion vectors are reduced to zero, which is equivalent to discarding them.

In the above example, the motion vectors associated with the car, which have a directional magnitude of +7, +5, +4, +4, +6, +5 pixel in the x-axis over the 6 successive frames are filtered by subtracting from each +2, 0, −1, −1, +1, and 0 pixel, respectively, which has been calculated to be the jitter along the x-axis. The filtered motion vectors reflect a car traveling at +5 pixel/frame, the "real" magnitude of the car's motion.

FIG. 5b is a data table reflecting further filtering operations of the embodiment of the invention of FIG. 5a. In the sequence of 4 frames, means 510 has identified or masked, for example vertical edges, E1–E5. Means 520 has recorded the directional magnitude of movement of the masked edges over the succession of frames, with respect to a previous frame, for example along the x-axis. Means 530 has determined the magnitude and direction of the movement over the successive frames and means 540 has identified common edges, i.e., those edges sharing a similarity of movement from frame-to-frame. In the example of FIG. 6b, means 540 has identified edges E1, E3 and E4 as exhibiting an identity of displacement from frame-to-frame. Edges E2 and E5 display characteristics of movement inconsistent with those displayed by edges E1, E3 and E4, and with each other, and likely are associated with "real" object motion.

The edges identified by means 540 likely would have been stationary but for jitter and therefore provide a relatively accurate assessment of the directional magnitude of the jitter, for each frame. In frame 1, for example, the average movement of Edges 1, 3 and 4 with respect to a previous frame (e.g. Frame 0, not shown) is +1 pixel (1 pixel to the right along the x-axis, as arbitrarily defined).

Means 550 preferably identifies the jitter signature in the displacement of edges 1, 3 and 4 and activates jitter filter 37. Jitter filter 37 filters the motion vectors for each frame by subtracting from the motion vectors the jitter component, if the motion vector has any component in the same axis in which the jitter has a component. As shown with respect to frame 1, E2 has moved +5 pixel with respect to a previous frame. However, some of this motion is attributable to jitter, which preferably should be removed from the motion vectors associated with the edge movement. It has been determined that the jitter component for Frame 1 is +1 pixel, and this component is subtracted from the directional magnitude of the movement of the motion vector associated with Edge 2, to arrive at an adjusted motion vector magnitude of +4 pixels. In a similar manner, Edge 5, which has moved −5 pixels (5 pixels to the left along the x-axis with respect to a previous frame) likely would generate a motion vector having a magnitude of −5 pixels. However, filter 37 filters the motion vector associated with the edge by subtracting +1 pixel from the measured motion of Edge 5 (or motion vector associated with Edge 5), whereby the adjusted edge displacement and motion vector magnitude is −6 pixels.

FIG. 5b shows the filtering provided in Frames 2–4, based on the displacement of the "common edges" 1, 3 and 4, and "other" moving edges 2 and 5 in those frames.

The embodiment shown and described above discussed the detection and elimination of jitter components from data corresponding to a moving object in an otherwise stationary image. The invention also is operable to detect and filter jitter from motion vector data generated by camera panning even where the jitter component is along the same axis as the camera panning or object motion. For example, during camera panning, for example to the right along the x-axis, all otherwise stationary vertical edges will move to the left along the x-axis by similar magnitudes from frame-to-frame. In fact, even if corrupted by jitter, these otherwise stationary edges will all show similar magnitudes of movement. Edges which reflect similar magnitudes of movement through a succession of frames can be identified by the invention. A large quantity of such edges likely reflects that the camera is panning. The invention analyzes the magnitudes of common displacement of these edges. In the event an oscillation is detected, for example if a large quantity of edges are displaced by a similar distance per frame, with respect to the preceding frame, but this distance varies from frame-to-frame, there likely is an element of jitter to the displacement.

For example, if a large quantity of edges are displaced on average −4, −4, −4, −4, −4 pixels along the x-axis through a succession of 5 frames, relative to an immediately preceding frame, the edge movement can be attributed to pure camera panning. If, however, a large quantity of edges are displaced on average −5, −4, −3, −4, and −5 pixels per frame along the x-axis relative to an immediately preceding frame through a succession of 5 frames, the invention will identify that some of the edge motion is due to jitter, based on the randomness and oscillation evident in the average edge displacement magnitudes. The motion attributable to the panning can be separated from the jitter component of the edge displacement by calculating the median of the average displacement over the succession of frames. In the example above, panning would account for movement of the edges by −3 pixels per frame. The difference between the panning component and the measured average displacement distance is jitter, which the invention preferably filters from all motion vectors having an x-axis component. In an alternative embodiment, the invention averages the average of the magnitudes of the "common edge" displacement, for example to arrive at an average value of −4.2 pixels per frame. The difference between this number and the average of the magnitudes of the displacement of the stationary edges per frame is treated as jitter for that frame and is subtracted from all motion vector associated with the frame, assuming the motion vector has a component in the same axis as the jitter. This embodiment also is operable to identify edge movement of a moving object in the panned scene, and to filter the jitter from the motion vectors associated with the moving object.

Figure 6:
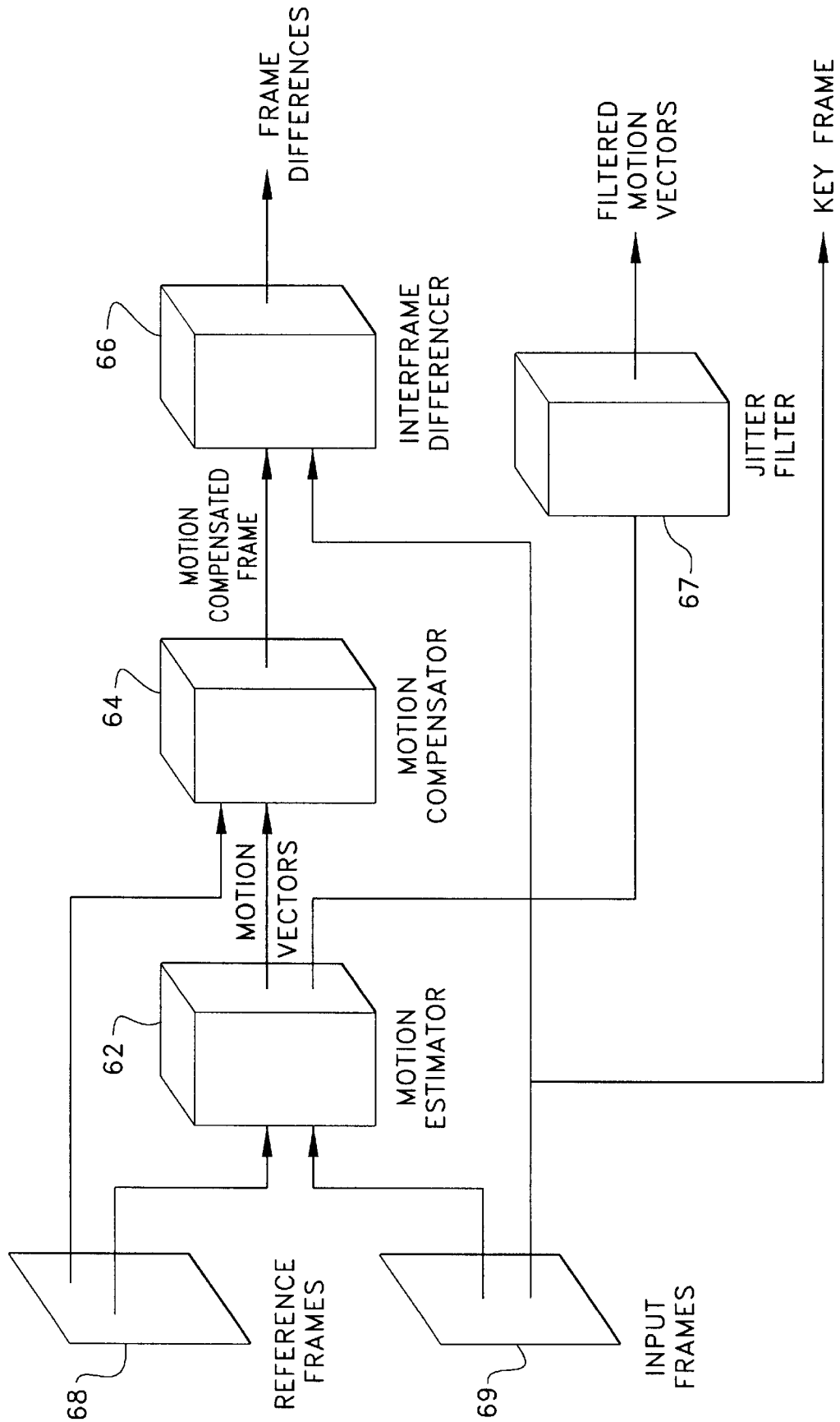
FIG. 6 is a block diagram of another embodiment of the jitter filtering motion estimation video codec architecture of the invention.
Figure 7:
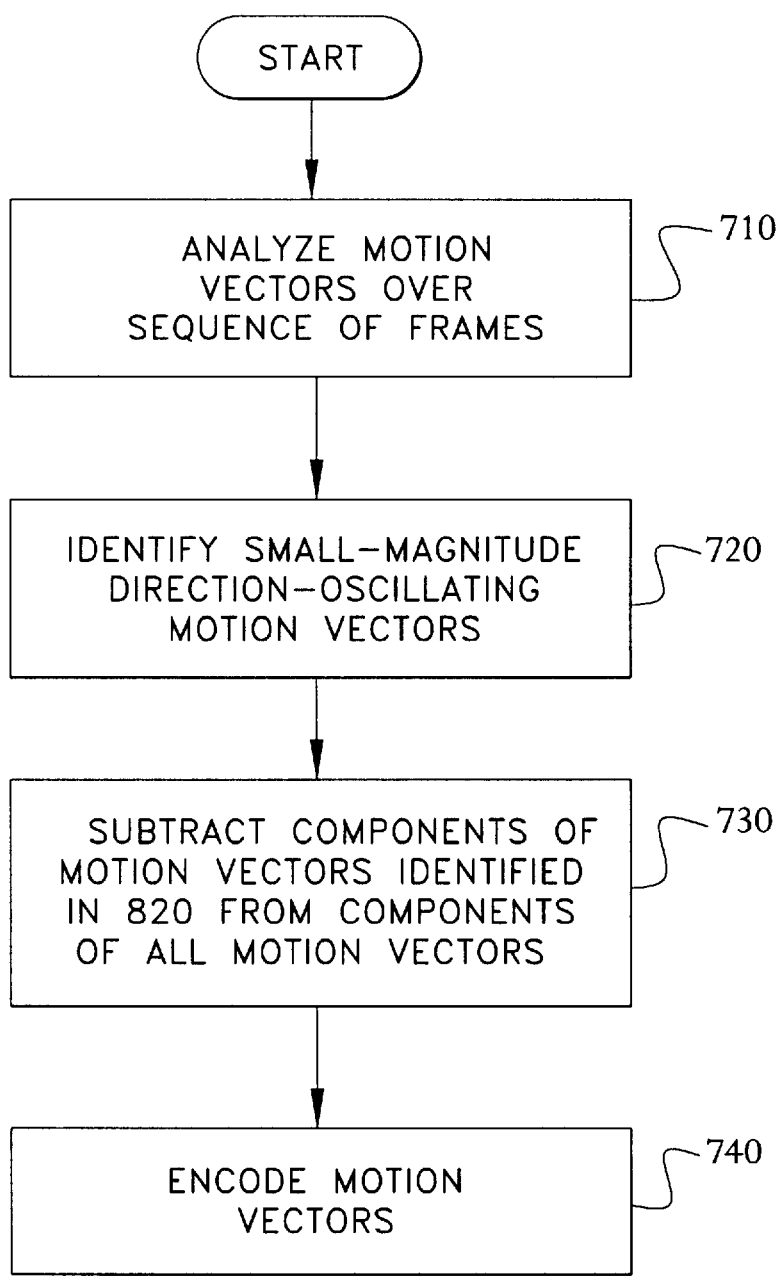
FIG. 7 is a flow chart diagram of the jitter filter of FIG. 6.
Figure 8A:
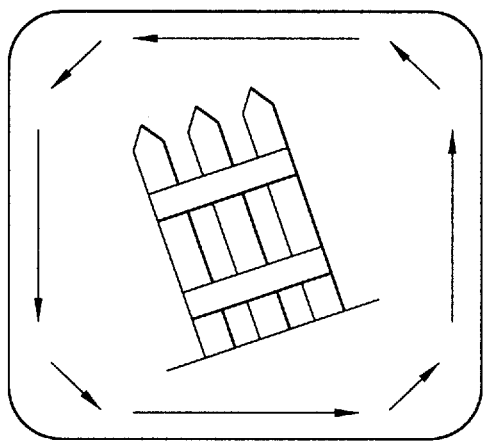
FIGS. 8a–8d are representations of sequential video frames depicting rotational jitter.
Figure 8B:
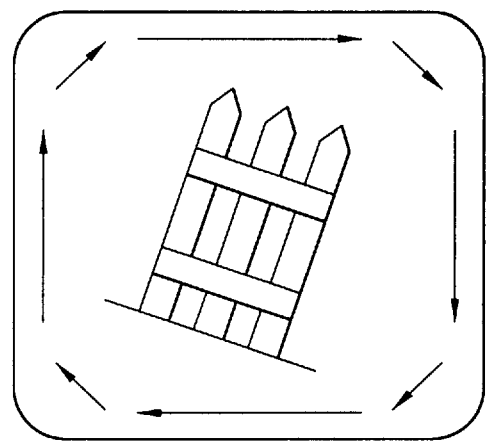
Figure 8C:
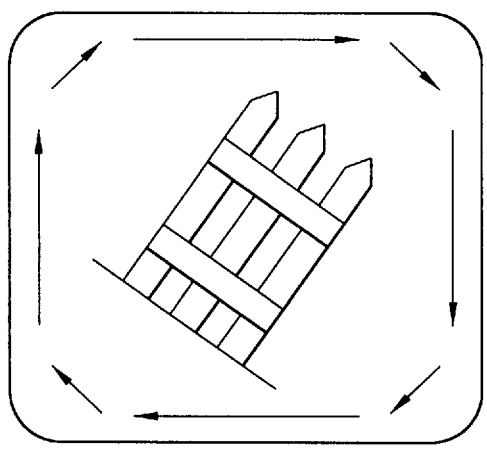
Figure 8D:
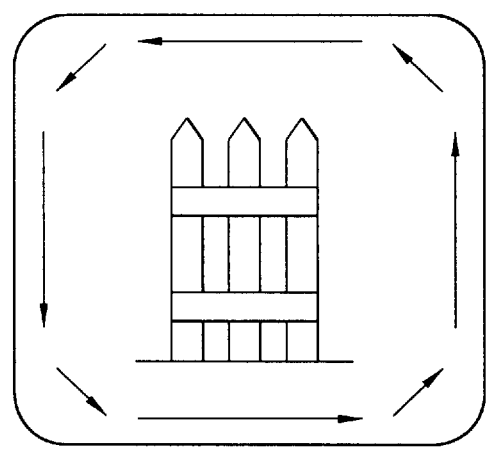

Referring now to FIGS. 6 and 7, a further embodiment of the invention is shown. The embodiment of FIG. 6 includes jitter filter 67 having means for analyzing all of the motion vectors for a frame over a succession of frames which have been extracted by motion estimator 62. There is no need for an edge detector or edge masking in the embodiment of FIG. 6.

Jitter filter 67 includes means 720 for identifying small-magnitude motion vectors which randomly vary in magnitude and/or oscillate in direction. These motion vectors likely have been generated by jitter, in which case they can be filtered by means 730 prior to encoding and transmission. Filtering is accomplished by means 730 by removing from the components of all motion vectors the component attributable to jitter which has been identified by means 720 in the small-magnitude, direction oscillating motion vectors.

Although translational jitter which manifests itself along a single plane is discussed above, jitter also can appear as random and oscillatory rotation about an axis, for example a z-axis.

Referring now to FIGS. 8a–8d, jitter manifested by rotation of an entire field of view is depicted. As shown, motion vectors on either side of the image, and on the top and bottom, are pointing in opposite directions. The motion vectors at the far edges will have larger magnitudes than the motion vectors oriented closer to the center of the image. The pattern of motion vectors shown in FIGS. 8a–8d form a 2-dimensional vector field which have 0 as a z-component and for which the x- and y- components depend only on x and y.

Figure 9:
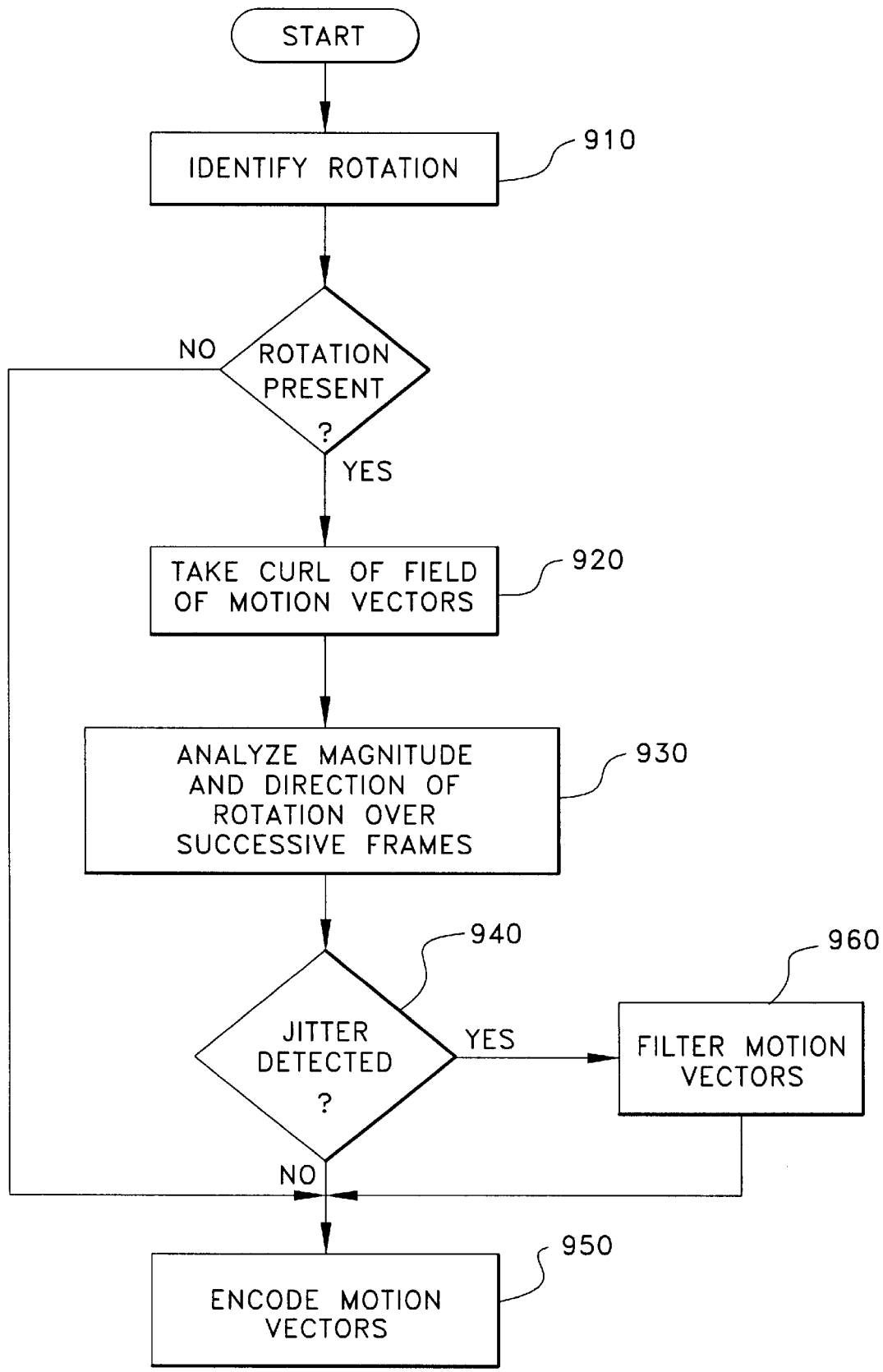
FIG. 9 is a flow chart diagram of a jitter filter for filtering rotational jitter.

Referring now to FIG. 9, means 910 identifies rotation of an entire frame of video, for example by analyzing the direction of motion vectors at opposite edges of the field of view. In the event rotation is identified by means 910, means 920 takes the curl of the vector field defined by all of the motion vectors of the frame, for successive frames of video. The product of the curl identifies the magnitude and direction of the rotation of the vector field, and correspondingly of the frame of video. Means 930 analyzes the angle and direction of the rotation of the successive frames of video. In the event the rotation of the successive frames is periodically, and perhaps unevenly oscillating, at a relatively high frequency, it is likely that the rotation is jitter, not for example, intended camera motion. In such an instance, means 940 will instruct means 960 to filter the motion vectors associated with the frames for example by rotating the entire image back. If the rotation is unidirectional, or occurring relatively slowly, or if any oscillation is at a relatively low frequency, it is likely that the rotation of the frame is from intended camera motion, or is actual scene movement, in which case the motion vectors are encoded by means 950 or transmitted for encoding.

In an alternate embodiment, the step of means 910 can be skipped, and the step of 920, taking the curl of motion vectors, is used to identify rotation, as well as identify magnitude and direction of any rotation identified. It is known that where there is no rotation, the curl product of the vector field will be 0.

In preferred embodiments of the invention, after jitter filter 37,67 separates jitter from legitimate motion vectors, the legitimate motion vectors are encoded and transmitted or stored for contemporaneous or later use in constructing a companded image frame for display. The unfiltered motion vectors from motion estimator 32,62, however, are used by motion compensator 34,64 to reconstruct a motion compensated frame comprised of blocks in the reference frame moved to new positions as dictated by the unfiltered motion vectors. Interframe differencer 36,66 compares the motion compensated frame to input frame 39,69 to generate frame differences comprised of the differences between the compared frames. Thus, although the jitter components of the motion vectors are not encoded and transmitted or stored for use in preparing a companded frame, the unfiltered motion vectors, including the jitter terms, are used in generating a motion compensated frame for frame differencing. Since jitter causes actual, albeit undesirable block movement, a failure to include the jitter terms when generating the motion compensated frame for frame differencing will result in mismatches between the input and motion compensated frames and consequent large frame differences, which typically must be encoded and transmitted. Using the unfiltered motion vectors to displace the blocks of the reference frame to generate the motion compensated frames increases the likelihood of a good match, since these motion vectors correspond to the motion which has occurred in the input frame (even though some of the movement is undesirable jitter).

The invention advantageously identifies movement of the contents of a series of frames and characterizes the movement as legitimate, real object or camera motion, or as unwanted jitter, or both. A number of possible embodiments of the invention are shown and described above. Further embodiments are possible. For example, in an embodiment described above, vertical edge masking is performed on a frame to identify strong vertical edges in the frame. Movement of the identified edges is tracked through a successive number of frames so that horizontal x-axis movement can be characterized. Once characterized, for example as real motion or as jitter, the motion vectors associated with the frames are processed accordingly.

It should be understood to those skilled in the art that in a like manner, a horizontal edge mask may be performed to identify strong horizontal edges in an image. The horizontal edges can be tracked and any movement of the edges characterized by the invention as either real motion or jitter, in the vertical direction.

It also should be understood by those skilled in the art that it is advisable to perform both vertical and horizontal edge masking together to identify both strong vertical and strong horizontal edges in a frame. Jitter in both the x- and y- planes can be thereby be identified and the motion vectors for such frames treated accordingly. Furthermore, it is possible that jitter may be identified along one axis and legitimate motion identified in the other axis. In such a case, it is within the scope of the invention to filter the jitter from the motion vectors along one axis while maintaining the component of the motion vector which reflects real motion along the other axis.

It also is possible that an image may concurrently exhibit rotational as well as translational jitter, i.e., movement in one or both of the x-and y- axis. The invention is operable to concurrently filter rotational and translational jitter. Furthermore, it is possible to filter rotational jitter from a translating image, and vice-versa.

In an alternative embodiment, if foreground/background analysis is performed, only those motion vectors corresponding to background blocks are filtered.

The invention therefore reduces the bit rate of a motion estimation video coder by filtering or discarding data representing jitter or a jitter component from motion vectors, which otherwise would be processed, such as encoded, transmitted and/or stored. In a like manner, the invention preserves long runs of run-length encoded motion vectors.

The present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

Furthermore, it should be understood that various changes in the details, materials, and arrangements of the parts which have been described and illustrated in order to explain the nature of this invention may be made by those skilled in the art without departing from the principle and scope of the invention as expressed in the following claims.

What I claim is:

1. A computer-implemented process for encoding video, comprising the steps of:
    (a) performing motion estimation on a sequence of images to generate a plurality of motion vectors and a plurality of difference signals, wherein the motion vectors and the difference signals are for use in motion-compensation encoding of the sequence of images;
    (b) characterizing jitter in the sequence of images, wherein the jitter is due to random, oscillatory movement of entire images in either or both of an X and a Y plane or rotation of the entire images about a Z axis;
    (c) adjusting the motion vectors to correct for the characterized jitter; and
    (d) encoding the adjusted motion vectors and the difference signals, wherein the adjusted motion vectors and difference signals may be used by a decoder to reconstruct motion-compensation-encoded images of the sequence of images.

2. The process of claim 1, wherein:
    step (b) comprises the steps of:
        (1) identifying one or more edges in the sequence of images; and
        (2) tracking motion of the edges over the sequence of images to generate at least one of an X component and a Y component of translational jitter for each image in the sequence of images; and
    step (c) comprises the step of subtracting the at least one of the X and Y components of the translational jitter from the motion vectors of each image.

3. The process of claim 2, wherein step (b)(2) comprises the step of distinguishing effects of translational jitter from effects of camera panning.

4. The process of claim 2, wherein the one or more edges comprise a first set of horizontal edges and a second set of vertical edges and step (b)(2) comprises the steps of:
    (i) tracking motion of the first set of horizontal edges over the sequence of images to generate the Y component of translational jitter for each image in the sequence of images; and
    (ii) tracking motion of the second set of vertical edges over the sequence of images to generate the X component of translational jitter for each image in the sequence of images.

5. The process of claim 1, wherein step (b) comprises the step of analyzing the motion vectors over the sequence of images to characterize the jitter.

6. The process of claim 5, wherein:
    step (b) comprises the steps of:
        (1) identifying a subset of motion vectors of each image having similar magnitude and direction; and
        (2) tracking the subset of motion vectors over the sequence of images to generate a jitter vector for each image; and
    step (c) comprises the step of subtracting the jitter vector from each of the motion vectors.

7. The process of claim 5, wherein:
    step (b) comprises the steps of:
        (1) applying a curl operator to the motion vectors of each image to generate a measure of rotation for each image;
        (2) tracking the measure of rotation over the sequence of images to generate a jitter rotation for each frame; and step (c) comprises the step of adjusting the motion vectors for each image based on the measure of rotation for said each image.

8. The process of claim 7, wherein step (b) further comprises the step of analyzing the motion vectors of each image to determine whether the image is associated with rotation and whether the rotation is sufficiently large to be corrected.

9. The process of claim 8, wherein step (b) comprises the step of identifying motion vectors at an opposing boundary of the frame having similar magnitudes but opposite directions.

10. The process of claim 1, wherein step (c) comprises the step of adjusting only motion vectors associated with static background portions of the images.

11. An apparatus for encoding video, comprising:
   (a) means for performing motion estimation on a sequence of images to generate a plurality of motion vectors and a plurality of difference signals, wherein the motion vectors and the difference signals are for use in motion-compensation encoding of the sequence of images;
   (b) means for characterizing jitter in the sequence of images, wherein the jitter is due to random, oscillatory movement of entire images in either or both of an X and a Y plane or rotation of the entire images about a Z axis;
   (c) means for adjusting the motion vectors to correct for the characterized jitter; and
   (d) means for encoding the adjusted motion vectors and the difference signals, wherein the adjusted motion vectors and difference signals may be used by a decoder to reconstruct motion-compensation-encoded images of the sequence of images.

12. The apparatus of claim 11, wherein:
   means (b) comprises means for:
      (1) identifying one or more edges in the sequence of images; and
      (2) tracking motion of the edges over the sequence of images to generate at least one of an X component and a Y component of translational jitter for each image in the sequence of images; and
   means (c) comprises means for subtracting the at least one of the X and Y components of the translational jitter from the motion vectors of each image.

13. The apparatus of claim 12, wherein means (b)(2) comprises means for distinguishing effects of translational jitter from effects of camera panning.

14. The apparatus of claim 12, wherein the one or more edges comprise a first set of horizontal edges and a second set of vertical edges and means (b)(2) comprises means for:
   (i) tracking motion of the first set of horizontal edges over the sequence of images to generate the Y component of translational jitter for each image in the sequence of images; and
   (ii) tracking motion of the second set of vertical edges over the sequence of images to generate the X component of translational jitter for each image in the sequence of images.

15. The apparatus of claim 11, wherein means (b) comprises means for analyzing the motion vectors over the sequence of images to characterize the jitter.

16. The apparatus of claim 15, wherein:
   means (b) comprises means for:
      (1) identifying a subset of motion vectors of each image having similar magnitude and direction; and
      (2) tracking the subset of motion vectors over the sequence of images to generate a jitter vector for each image; and
   means (c) comprises means for subtracting the jitter vector from each of the motion vectors.

17. The apparatus of claim 15, wherein:
   means (b) comprises means for:
      (1) applying a curl operator to the motion vectors of each image to generate a measure of rotation for each image;
      (2) tracking the measure of rotation over the sequence of images to generate a jitter rotation for each frame; and
   means (c) comprises means for adjusting the motion vectors for each image based on the measure of rotation for said each image.

18. The apparatus of claim 17, wherein means (b) further comprises means for analyzing the motion vectors of each image to determine whether the image is associated with rotation and whether the rotation is sufficiently large to be corrected.

19. The apparatus of claim 18, wherein means (b) comprises means for identifying motion vectors at an opposing boundary of the frame having similar magnitudes but opposite directions.

20. The apparatus of claim 11, wherein means (c) comprises means for adjusting only motion vectors associated with static background portions of the images.

21. A storage medium having stored thereon a plurality of instructions for encoding video, wherein the plurality of instructions, when executed by a processor, cause the processor to perform the steps of:
   (a) performing motion estimation on a sequence of images to generate a plurality of motion vectors and a plurality of difference signals, wherein the motion vectors and the difference signals are for use in motion-compensation encoding of the sequence of images;
   (b) characterizing jitter in the sequence of images, wherein the jitter is due to random, oscillatory movement of entire images in either or both of an X and a Y plane or rotation of the entire images about a Z axis;
   (c) adjusting the motion vectors to correct for the characterized jitter; and
   (d) encoding the adjusted motion vectors and the difference signals, wherein the adjusted motion vectors and difference signals may be used by a decoder to reconstruct motion-compensation-encoded images of the sequence of images.

22. The storage medium of claim 21, wherein:
   step (b) comprises the steps of:
      (1) identifying one or more edges in the sequence of images; and
      (2) tracking motion of the edges over the sequence of images to generate at least one of an X component and a Y component of translational jitter for each image in the sequence of images; and
   step (c) comprises the step of subtracting the at least one of the X and Y components of the translational jitter from the motion vectors of each image.

23. The storage medium of claim 22, wherein step (b)(2) comprises the step of distinguishing effects of translational jitter from effects of camera panning.

24. The storage medium of claim 22, wherein the one or more edges comprise a first set of horizontal edges and a second set of vertical edges and step (b)(2) comprises the steps of:
   (i) tracking motion of the first set of horizontal edges over the sequence of images to generate the Y component of translational jitter for each image in the sequence of images; and (ii) tracking motion of the second set of vertical edges over the sequence of images to generate the X component of translational jitter for each image in the sequence of images.

25. The storage medium of claim 21, wherein step (b) comprises the step of analyzing the motion vectors over the sequence of images to characterize the jitter.

26. The storage medium of claim 25, wherein: step (b) comprises the steps of:
- (1) identifying a subset of motion vectors of each image having similar magnitude and direction; and
- (2) tracking the subset of motion vectors over the sequence of images to generate a jitter vector for each image; and step (c) comprises the step of subtracting the jitter vector from each of the motion vectors.

27. The storage medium of claim 25, wherein: step (b) comprises the steps of:
- (1) applying a curl operator to the motion vectors of each image to generate a measure of rotation for each image;
- (2) tracking the measure of rotation over the sequence of images to generate a jitter rotation for each frame; and step (c) comprises the step of adjusting the motion vectors for each image based on the measure of rotation for said each image.

28. The storage medium of claim 27, wherein step (b) further comprises the step of analyzing the motion vectors of each image to determine whether the image is associated with rotation and whether the rotation is sufficiently large to be corrected.

29. The storage medium of claim 28, wherein step (b) comprises the step of identifying motion vectors at an opposing boundary of the frame having similar magnitudes but opposite directions.

30. The storage medium of claim 21, wherein step (c) comprises the step of adjusting only motion vectors associated with static background portions of the images.

* * * * *